D. E. DUTROW.
RAILROAD CURVES.
No. 188,877. Patented March 27, 1877.
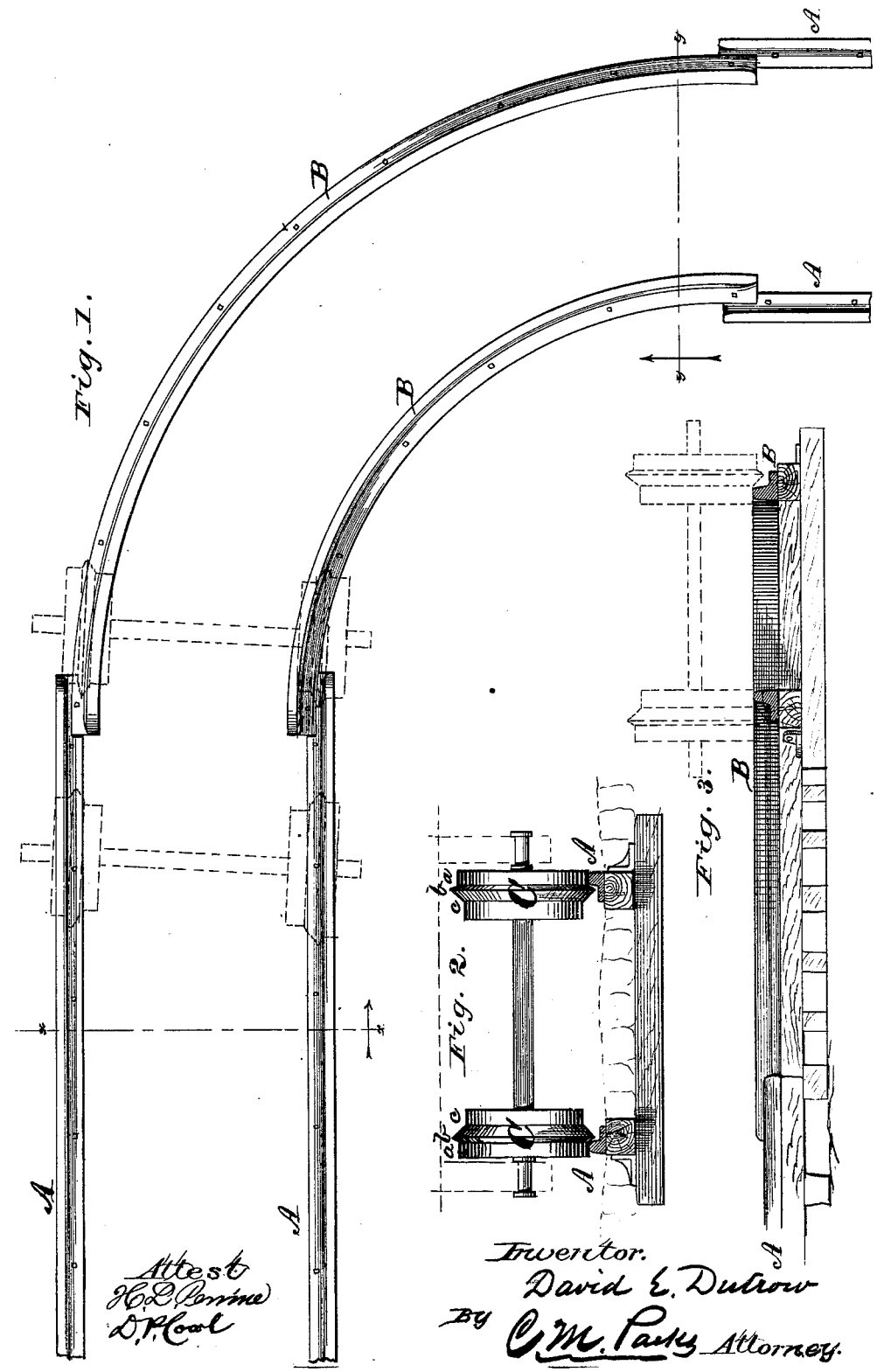

UNITED STATES PATENT OFFICE.

DAVID E. DUTROW, OF WASHINGTON, DISTRICT OF COLUMBIA.

IMPROVEMENT IN RAILROAD-CURVES.

Specification forming part of Letters Patent No. 188,877, dated March 27, 1877; application filed Febeuary 27, 1877.

*To all whom it may concern:*

Be it known that I, DAVID E. DUTROW, of Washington, District of Columbia, have invented an Improved Railroad-Curve; and I do hereby declare the following to be a full and correct description of the same, reference being had to the accompanying drawings, in which—

Figure 1 is a top view of my improved railroad-curve, showing the truck in dotted lines in position. Fig. 2 is a cross-section of a straight track, $x\ x$, Fig. 1, showing the wheels in position; and Fig. 3 is a cross-section of the curve track, $y\ y$, Fig. 1, showing the wheels in dotted lines in position.

The object of my invention is to facilitate the turning of curves upon railroads, particularly street-railroads or tramways, and lessen the friction, and at the same time lessen the expense.

My invention consists in making the curves of a railroad of a narrower gage than the straight track, and in street-railroads using a single track on the curves, instead of a double or grooved track. To this end I provide the wheels of the trucks with two treads—one each side of the flange—or, in other words, provide the ordinary car-wheel with an additional tread on the opposite side of the flange, to run on the track of the curve, which is of a narrow gage to accommodate it.

In the drawings, A represents the ordinary track of a straight railroad, and B the track of the curve. The difference in the construction of these tracks is that the base in the curved track extends out from the opposite side from that of the straight track, or the curve track is the reverse of the straight track. The same track bent will answer every purpose, and save the expense of the grooved curved rail in common use. The curved rail B is set inside of the rail A in a position similar to the inside flange of the ordinary grooved rail in use; but it may be set in at any distance. C represents the wheel of a truck standing upon the track A, having the tread $a$, flange $b$, and additional tread $c$.

The wheel, independent of the tread $c$, is similar to the ordinary wheel, except that upon the opposite side of the flange $b$ is placed the tread $c$, a little smaller than the tread $a$, though this is not essential.

It will be noticed that the flange $b$, on the side next the tread $c$, is beveled. This is necessary in order to give room for the curvature of the track, as shown in dotted lines in Fig. 1.

The operation of my device is as follows: The ordinary rail having been bent in an opposite direction, and placed upon the curves, instead of the ordinary grooved rail and the double-treaded wheeled trucks placed upon the straight track, as shown in Fig. 2, it is obvious that when the truck reaches the curve consisting of rails B the tread $c$ will run upon the track $b$, and the tread $a$ will leave the track A until the straight road is reached, when the tread $a$ and track A will resume their ordinary position.

The advantages of my construction, besides the fact that but one form of rail is necessary, doing away with the expensive grooved rail for curves, are, that much shorter curves can be laid in street-railroads, and used with less friction than with the ordinary method.

It is a well-known fact in railroad engineering that where very short curves are necessary a narrow-gage track must be used. Now, in my device I unite all the advantages of the broad gage on the straight roads and the narrow gage on the curves.

My curves may be still narrower than I have shown them by putting extra wheels reversed upon the same axles, inside the ordinary wheels; but usually this will not be necessary.

Having thus fully described my invention, what I claim, and desire to secure by Letters Patent, is—

1. A street or other railroad having the curves of a narrower gage than the straight track, substantially as described.

2. The combination of a railroad-track, having the curves of a narrower gage than the straight track, with the wheels of a truck having two treads, substantially as described.

The above specification of my said invention signed and witnessed at Washington this 26th day of February, A. D. 1877.

DAVID E. DUTROW.

Witnesses:
THOMAS C. CONNOLLY,
C. M. PARKS.